United States Patent [19]

Kubek et al.

[11] Patent Number: 4,814,104
[45] Date of Patent: Mar. 21, 1989

[54] TERTIARY ALKANOLAMINE ABSORBENT CONTAINING AN ETHYLENEAMINE PROMOTER AND ITS METHOD OF USE

[75] Inventors: Daniel J. Kubek, White Plains, N.Y.; Debra S. Kovach, Ridgewood, N.J.

[73] Assignee: UOP, DesPlains, Ill.

[21] Appl. No.: 11,195

[22] Filed: Feb. 5, 1987

[51] Int. Cl.[4] ............................................. C09K 3/00
[52] U.S. Cl. .................................... 252/189; 252/190
[58] Field of Search ................. 252/189, 190; 564/479

[56] References Cited

U.S. PATENT DOCUMENTS

| | | | |
|---|---|---|---|
| 2,946,652 | 7/1960 | Bloch | 423/229 X |
| 3,535,260 | 10/1970 | Singh | 252/189 |
| 3,653,810 | 4/1972 | Bratzler et al. | 423/229 |
| 4,094,957 | 5/1978 | Sartori | 423/223 |
| 4,112,052 | 9/1978 | Sartori | 423/228 |
| 4,217,237 | 8/1980 | Sartori | 252/192 |
| 4,240,922 | 12/1980 | Sartori et al. | 252/189 |
| 4,336,233 | 6/1982 | Appl et al. | 423/229 X |
| 4,405,479 | 9/1983 | Sartori | 423/223 |
| 4,405,577 | 9/1983 | Sartori | 423/223 |
| 4,405,578 | 9/1983 | Sartori | 423/223 |
| 4,578,517 | 3/1986 | Johnson et al. | 564/479 |

FOREIGN PATENT DOCUMENTS 798856 12/1955 United Kingdom ................ 252/189

OTHER PUBLICATIONS

Promotion of $CO_2$ Mass Transfer in Carbonate Solutions—Chemical Engineering Science, vol. 36, pp. 581–588 (1981).

Sterically Hindered Amines for $CO_2$ Removal from Gases, Ind. Engr. Chem. Fund., vol. 22, pp. 239–249 (1983).

Primary Examiner—Matthew A. Thexton
Attorney, Agent, or Firm—E. Lieberstein

[57] ABSTRACT

Absorption of carbon dioxide from gas mixtures with aqueous absorbent solutions of tertiary alkanolamines is improved by incorporating at least one alkyleneamine in the solution. The presence of the alkyleneamine promotes the rate of carbon dioxide absorption and the carbon dioxide capacity of the aqueous tertiary alkanolamine solution. As a result, absorption can be carried out in shorter absorber columns, and process energy requirements can be lowered by reducing the rate at which the absorbent solution is circulated.

27 Claims, 2 Drawing Sheets

VAPOR LIQUID EQUILIBRIA AND RATE OF ABSORPTION DATA
50 WT% MDEA W/ AND W/O 3 WT% ADDITIVE COMPARISON
WITH CO2 COMPRESSIBILITY ACCOUNTED FOR

FIG. I

TERTIARY ALKANOLAMINE ABSORBENT CONTAINING AN ETHYLENEAMINE PROMOTER AND ITS METHOD OF USE

BACKGROUND OF THE INVENTION

For many years, carbon dioxide has been removed from gaseous mixtures with various absorbent liquids.

Alkali metal salts such as carbonates, phosphates, borates, and phenates of sodium and potassium are one category of absorbent liquid. The carbon dioxide absorption rates of such salts is, however, rather low, and, therefore, it has been necessary to add promoting agents to these salts. British Pat. No. 798,856 to S.P.A. Vetrocoke discloses that an inorganic or organic compound of trivalent arsenic is useful in activating such salts. In Astarita et al.'s "Promotion of $CO_2$ Mass Transfer In Carbonate Solutions", *Chemical Engineering Science*, Vol. 36, pp. 581–88 (1981), it is mentioned that arsenious acid, ethanolamines, and amino acids promote the absorption of carbon dioxide by carbonate-bicarbonate salts. U.S. Pat. No. 4,094,957 to Sartori et al., U.S. Pat. No. 4,112,052 to Sartori et al., U.S. Pat. No. 4,217,237 to Sartori et al., U.S. Pat. No. 4,405,577 to Sartori et al., U.S. Pat. No. 4,405,578 to Sartori et al., U.S. Pat. No. 4,405,579 to Sartori et al., and Sartori et al.'s "Sterically Hindered Amines for $CO_2$ Removal from Gases", *Industrial Engineering Chemical Fundamentals*, Vol. 22, pp. 239–49 (1983) ("Sartori article") all disclose activating a basic salt for removing carbon dioxide from gaseous mixtures with sterically hindered amines or amino acids (i.e. a primary amine in which the amino group is attached to a tertiary carbon atom or a secondary amine in which the amino group is attached to a secondary or tertiary carbon atom).

Alkanolamines in aqueous solution are another class of absorbent liquid for removal of carbon dioxide from gaseous mixtures. Alkanolamines are classified as primary, secondary, or tertiary depending on the number of non-hydrogen substituents bonded to the nitrogen atom of the amino group. Monoethanolamine ($HOCH_2CH_2NH_2$) is an example of a well-known primary alkanolamine. Conventionally used secondary alkanolamines include diethanolamine (($HOCH_2CH_2)_2NH$) and diisopropanol amine (($CH_3CHOHCH_3)_2NH$). Triethanolamine (($HOCH_2CH_2)_3N$) and methyldiethanolamine (($HOCH_2CH_2)_2NCH_3$) are examples of tertiary alkanolamines which have been used to absorb carbon dioxide from industrial gas mixtures. These alkanolamines are not only useful in absorbing carbon dioxide, but they have also been employed to absorb hydrogen sulfide or carbonyl sulfide from gas mixtures which may or may not contain carbon dioxide.

After absorption of carbon dioxide and/or hydrogen sulfide and/or carbonyl sulfide in an alkanolamine solution, the solution is regenerated to remove absorbed gases. The regenerated alkanolamine solution can then be recycled for further absorption. Absorption and regeneration are usually carried out in different separatory columns containing packing or bubble plates for efficient operation. Regeneration is generally achieved in 2 stages. First, the absorbent solution's pressure is reduced so that absorbed carbon dioxide is vaporized from the solution in one or more flash regenerating columns. Next, the flashed absorbent is stripped with steam in a stripping regenerating column to remove residual absorbed carbon dioxide. With primary and secondary alkanolamines, the nitrogen reacts rapidly and directly with carbon dioxide to bring the carbon dioxide into solution according to the following reaction sequence:

where R is an alkanol group. To obtain concentrations of carbon dioxide in solution which are greater than 0.5 mole of carbon dioxide per mole of alkanolamine, a portion of the carbamate reaction product ($RNHCOO^-$) must be hydrolyzed to bicarbonate ($HCO_3^-$) according to the following reaction:

$$RNHCOO^- + H_2O \rightleftharpoons RNH_2 + HCO_3^-$$

There is a characteristic equilibrium between the carbamate ($RNHCOO^-$) and bicarbonate ($HCO_3^-$) ions for each alkanolamine which determines the vapor-liquid equilibrium or solution phase concentration of carbon dioxide for any given gas phase pressure of carbon dioxide. The alkanol substituent groups R which are attached to the nitrogen atom of any alkanolamine affect the basicity of the alkanolamine and its reactivity toward and vapor-liquid equilibrium with carbon dioxide.

In forming a carbamate, primary and secondary alkanolamines undergo a fast direct reaction with carbon dioxide which makes the rate of carbon dioxide absorption rapid. However, considerable heat is required to break the bond between the alkanolamine and carbon dioxide in the carbamate and regenerate the absorbent. In addition, primary and secondary alkanolamines have a limited capacity to absorb carbon dioxide due to the formation of stable carbamates. The Sartori article teaches that loading of such alkanolamines is improved by incorporating sterically hindered amines. Meanwhile, British Pat. No. 798,856 activates primary alkanolamines, like ethanolamine, with arsenious oxide.

Unlike primary and secondary alkanolamines, tertiary alkanolamines cannot react directly with carbon dioxide, because their amine reaction site is fully substituted with substituent groups. Instead, carbon dioxide is absorbed into solution by the following slow reaction with water to form bicarbonate:

Because tertiary alkanolamines do not bond with carbon dioxide, they can be economically regenerated often by simply reducing pressure in the system (i.e. flash regenerating); little or no thermal regeneration is required. Although the absence of a direct reaction with carbon dioxide makes regeneration of tertiary alkanolamines more economical, large solvent circulation rates and high liquid to gas ratios (i.e. high liquid loadings) in the absorber are required due to the slow absorption of carbon dioxide. Consequently, systems utilizing tertiary alkanolamines require absorption columns of increased height and diameter compared to systems employing either primary or secondary alkanolamines.

In order to increase the rate of carbon dioxide absorption by aqueous tertiary alkanolamine solutions, promoters have been added. In U.S. Pat. No. 4,336,233 to Appl et al ("Appl patent"), a piperazine promoter is incorporated in an aqueous methyldiethanolamine solution. The process disclosed by the Appl patent "employs aqueous solutions of a bottom product obtained as a by-product from the synthesis of ethylenediamine from monoethanolamine and ammonia; this material also contains 0.3 percent by weight, based on piperazine of the following by-products: NH₃, ethylenediamine, MEA, and further nitrogen-containing products." The by-products are merely said to "not interfere with the process according to" the Appl patent.

Promoted methyldiethanolamine solutions have both an increased rate of carbon dioxide absorption and an increased capacity for carbon dioxide compared to unpromoted methyldiethanolamine. Improved rate of absorption is particularly evident at low levels of carbon dioxide loading and diminishes as such loading increases. The full benefit of the promoter is found in processes which employ thermal regeneration in addition to flash regeneration of the absorbent to maintain the low loading levels necessary to produce a gas product with low levels of carbon dioxide. Flash regeneration alone is sufficient for bulk removal of carbon dioxide from high pressure gases (i.e. carbon dioxide partial pressure greater than 50 psia) where low carbon dioxide specifications in the product gas are not needed.

DESCRIPTION OF THE INVENTION

The absorption of carbon dioxide from gas mixtures with aqueous absorbent solutions of tertiary alkanolamines is improved by incorporating at least one alkyleneamine promoter in the solution. The alkyleneamine is incorporated in an amount sufficient to enhance substantially the carbon dioxide absorption rate by at least 10%, usually by 25–200% and/or the capacity of the tertiary alkanolamine in water by as much as 70%.

The tertiary alkanolamines utilized can be any of a variety of compounds suitable for absorbing carbon dioxide from gas mixtures. Examples of these absorbent alkanolamines include: methyldiethanolamine, triethanolamine, dimethylethanolamine, diethylethanolamine, methyldiisopropanolamine, and mixtures thereof. Methyldiethanolamine and triethanolamine are the preferred tertiary alkanolamines with methyldiethanolamine being most preferred.

The promoter utilized by the present invention is generally at least one alkyleneamine defined by the formula:

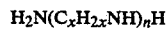

$$H_2N(C_xH_{2x}NH)_nH$$

wherein x is 1 to 4, while n is 1 to 12. More preferably, the present promotion additive is at least one ethyleneamine or propyleneamine selected from a homologous series of polyamines, all of which contain two primary amino groups with other amino groups, if any, being secondary. Ethyleneamines which are useful in the present invention are defined by the formula:

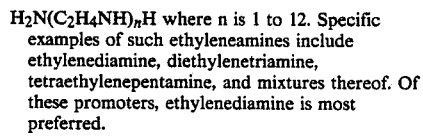

$H_2N(C_2H_4NH)_nH$ where n is 1 to 12. Specific examples of such ethyleneamines include ethylenediamine, diethylenetriamine, tetraethylenepentamine, and mixtures thereof. Of these promoters, ethylenediamine is most preferred.

The alkyleneamine-promoted tertiary alkanolamine absorbents may additionally contain conventional corrosion inhibitors to prevent corrosion caused by carbon dioxide absorbed in the tertiary alkanolamine absorbent solution. When corrosion in the process is controlled, higher alkanolamine strengths can be utilized to reduce absorbent circulation rates, equipment size, and operating costs.

The alkyleneamine-promoted tertiary alkanolamine absorbents of the present invention can be prepared as an aqueous solution which is ready to be used in the field. In ready-to-use form, the aqueous absorbent solution may contain 35–65 wt. % water, preferably 45–55 wt. % water, add most preferably 50 wt. % water. The alkyleneamine promoter in the promotion additive is present in an amount sufficient to enhance the rate at which cool (to 100°–130° F.) aqueous tertiary alkanolamines absorb carbon dioxide from warm (150°–200° F.) gas mixtures in a gas-liquid contact apparatus. Such enhancement in the rate of carbon dioxide absorption is achieved when the alkyleneamine- promoted tertiary alkanolamine achieves at least 10%, usually 25–200%, faster carbon dioxide removal than the same absorbent without the alkyleneamine. This generally occurs when the alkyleneamine is 0.5–10 wt. % of the aqueous absorbent solution, preferably 2–6 wt. %, and most preferably 3–4 wt. %. An effective amount of the corrosion inhibitor, if any, for purposes of the present invention is about 0.05–0.1 wt. % of the aqueous absorbent solution. The tertiary alkanolamine comprises the remainder of the absorbent solution.

Alternatively, the alkyleneamine-promoted tertiary alkanolamine can be prepared as a concentrate, shipped to the facility where it is to be utilized, and then diluted with water prior to use. In its concentrated, non-aqueous form, the absorbent contains 1.0–20 wt. % of alkyleneamine promoter, preferably 4–12 wt. %, and most preferably 5 to 8 wt. %. The tertiary alkanolamine constitutes the remainder of the concentrated absorbent. The mole ratio of alkyleneamine to alkanolamine is 0.01 to 0.5, preferably 0.05 to 0.27, most preferably 0.07 to 0.17.

In use, the aqueous ethyleneamine-promoted alkanolamine solution (i.e. lean absorbent) at temperatures of 120° F. to 200° F. is contacted with an industrial gas containing carbon dioxide at partial pressures of 25 psia to 250 psia or higher in an absorption zone and both a product gas substantially free of carbon dioxide (i.e. 0.01 volume % to 0.1 volume % for trim gas removal and 3–5% for bulk gas removal) and an aqueous alkyleneamine-promoted alkanolamine solution laden with absorbed carbon dioxide and optionally absorbed hydrogen sulfide or carbonyl sulfide (i.e. rich absorbent) are withdrawn from the absorption zone. In addition, the aqueous alkyleneamine-promoted alkanolamine can be used to treat gases with hydrogen sulfide and/or carbonyl sulfide containing little or no carbon dioxide. The absorption zone is preferably a gas-liquid contact column containing bubble plates or packing to improve absorption.

To conserve absorbent, the rich absorbent is regenerated in at least one regenerating column and then recycled to the absorption column. Such regeneration is achieved by first removing absorbed carbon dioxide from the rich absorbent by reducing the absorbent's pressure in at least one flash regenerating column (i.e. flash regenerating) to pressures as low as 7 psia and as high 20 psia and then stripping the flashed absorbent with steam in a stripping regenerator column operating at 235° to 265° F. to remove absorbed carbon dioxide to a residual loading of approximately 0.005 to 0.05, preferably 0.01 moles of carbon dioxide per mole of alkanolamine. The flash regenerating column and the stripping regenerator column both contain either packing or bubble plates for more efficient regeneration. The carbon dioxide-containing gas produced in each regenerating column can either be removed from the absorption/regeneration installation separately or the gas generated by the stripping regenerator column can be passed into the flash regenerating column and removed with the gas generated therein. Alternatively, regeneration can in some cases be carried out with just a flash regenerating step due to the ease with which tertiary alkanolamines are regenerated.

A wide variety of industrial gases (e.g. fuel gases, gasification product gases, refinery gases, synthesis gases, natural gas, and enhanced oil recover associated gases) can be treated with alkyleneamine promoted tertiary alkanolamine absorbent solutions utilizing the above-described absorption/regeneration scheme. These gases can include compounds in the range of amounts shown in Table 1.

TABLE 1

| Compound | Amount (Volume percent) |
| --- | --- |
| $CO_2$ | 10–40% |
| CO | 20–40% |
| $H_2$ | 0–80% |
| $CH_4$ | 0.1–90% |
| $C_2H_{2n+n}$ (n = 2–6) | 0–30% |
| $N_2$ | 0–20% |
| $H_2S$ | 0–20% |
| COS | 0–0.1% |

Synthesis gas containing the compounds in the amounts shown below in Table 2 is particularly well suited to treatment with absorbent solutions in accordance with present invention.

TABLE 2

| Compound | Amount (Volume percent) |
| --- | --- |
| $CO_2$ | 15–35% |
| CO | 20–40% |
| $H_2$ | 20–40% |
| $CH_4$ | 0.1–5% |
| $N_2$ | 0–20% |
| $H_2S$ | 0–3% |
| COS | 0–0.1% |

Typically, contacting such gas with absorbents in accordance with the present invention reduces the carbon dioxide content in the gas by between 75 and 100 vol. % to yield gases of less than 3 vol. % carbon dioxide. The alkyleneamine-promoted tertiary alkanolamine also reduces the hydrogen sulfide content in the gas by between 99.5 and 100 vol. % to less than 0.0004 vol. % and reduces the carbonyl sulfide content in the gas by 50–90 vol. % to less than 0.001 vol. %.

DETAILED DESCRIPTION OF THE DRAWING

Figure 1:
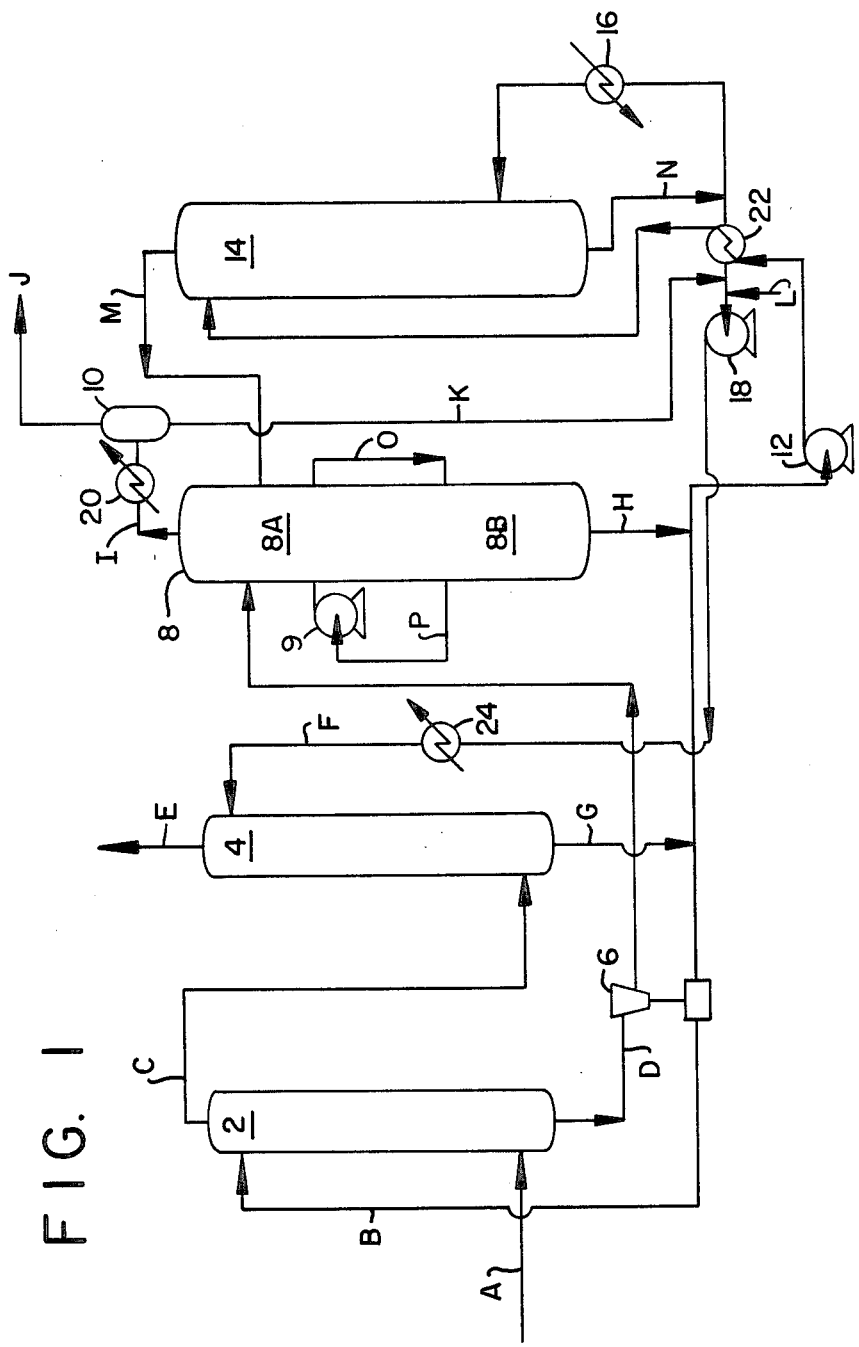
FIG. 1 is a process flow diagram for an absorption and regeneration process utilizing a tertiary alkanolamine absorbent containing an alkyleneamine promoter according to the present invention.

In a preferred embodiment, as shown in the process flow diagram of FIG. 1, carbon dioxide is removed in two absorption columns connected in series. Synthesis gas A is first directed into bulk $CO_2$ absorber 2 where it is contacted countercurrently with lean bulk absorbent B. A bulk absorber product gas C from whic 65 to 85% of the carbon dioxide in the synthesis gas A has been removed is withdrawn from bulk $CO_2$ absorber 2 as an overhead product, while rich bulk absorbent D is withdrawn as a bottom product. The bulk absorbent product gas C is then conveyed into a lower portion of trim $CO_2$ absorber 4 and countercurrently contacted with lean trim absorbent F which removes substantially all the remaining carbon dioxide. A substantially $CO_2$-free trim absorber product gas E is removed from trim $CO_2$ absorber 4 as an overhead product, while rich trim absorbent G is withdrawn as a bottom product.

Regeneration of the rich absorbent streams is also carried out in two columns. Rich bulk absorbent D undergoes a pressure drop through turbine 6 and then passes into flash regeneration column 8 having a top section 8A and a bottom section 8B. Gases P are conveyed by vacuum compressor 9 from bottom section 8B to top section 8A, while liquid O flows from top section 8A to bottom section 8B by gravity. In flash regeneration column 8 which operates at pressure of 7 to 20 psia, some of the absorbed $CO_2$ flashes and is removed from flash regeneration column 8 as an overhead product I. Product I then passes through condenser 20 which is cooled (to 100°–130° F.) with water to permit non-condensibles to be separated and removed from reflux drum 10 as a gaseous product J, while condensibles K are withdrawn as a liquid,product. Flash regenerated absorbent H is withdrawn from flash regeneration column 8 as a bottom product which can either be combined with rich trim absorbent G and directed by turbine 6 to bulk $CO_2$ absorber 2 as lean bulk absorbent B or be conveyed by pump 12 to stripping regeneration column 14. In stripping regeneration column 14, residual carbon dioxide is removed as stripping regeneration overhead product M which is then recycled to flash regeneration column 8 from which carbon dioxide is removed from the system. Such recycling enhances the flashing of carbon dioxide in flash regeneration column 8. Stripping regeneration bottoms product N is either conveyed through steam reboiler 16 and returned to stripping regeneration column 14 or combined with make-up water L and condensate K and recycled by pump 18 to trim $CO_2$ absorber 4 as lean trim absorbent F.

To reduce process energy requirements and improve absorption efficiency, a portion of stripping regeneration bottoms product N is cooled from about 250° F. to 170° F. by incoming flash regenerated absorbent H in heat exhanger 22. That portion of bottoms product N which becomes lean trim absorbent F is further cooled (to 100°–130° F.) with water in cooler 24. As a result of its heat exchange contact with stripping regeneration bottoms product N, flash regenerated absorbent H is preheated (to 150°–235° F.) prior to entering stripping regeneration column 14.

EXAMPLE 1

In commercial use, 142,333 standard cubic feet per minute of synthesis gas A produced by the partial oxidation of natural gas with steam and air could be treated in accordance with the process flow diagram of FIG. 1 for ultimate use of the purified synthesis gas in a 1200 ton per day ammonia product facility.

Synthesis gas A containing 41.9 mole % hydrogen, 41.0 mole % nitrogen, 15.7 mole % carbon dioxide, 0.7 mole % carbon monoxide, 0.5 mole % argon, 0.2 mole % methane, and 0.1 mole % helium enters the bottom of bulk $CO_2$ absorber 2 which is 11 feet in diameter and contains two 28 foot packed beds of structured stainless steel packing at 170° F. and 400.0 psia. In bulk $CO_2$ absorber 2, synthesis gas A countercurrently contacts lean bulk absorbent B which is an aqueous solution containing 47 weight percent methyldiethanolamine and 3 weight percent ethylenediamine. Lean bulk absorbent B is fed to the top of bulk $CO_2$ absorber 2 at a rate of 6609 gallons per minute at a temperature of 155° F., and at a loading of 0.27 moles of carbon dioxide per mole of methyldiethanolamine. Carbon dioxide is removed from synthesis gas A at a rate of 2746 moles per hour so that bulk absorbent product gas C which has a temperature of 155° F. and 399 psia contains 3.95 mole % carbon dioxide.

Bulk absorbent product gas C then enters the base of the 36 tray trim $CO_2$ absorber 4 and is countercurrently contacted with lean trim absorbent F which is also an aqueous solution of 47 weight % methyldiethanolamine and 3 weight percent ethylenediamine which has been regenerated to a lean $CO_2$ solution loading of 0.01 moles of carbon dioxide per mole of methyldiethanolamine. Lean trim absorbent F is fed into the top of trim $CO_2$ absorber 4 at a temperature of 105° F. and at a flowrate of 1368 gallons per minute. Carbon dioxide is removed from bulk absorber product gas C at a rate of 769.3 moles per hour so that the carbon dioxide content of the trim absorber product gas E is reduced to 1000 volumetric ppm or 0.1 mole %.

Rich bulk absorbent D which is discharged from the bottom of the bulk $CO_2$ absorber 2 at a temperature of 181° F., at a flowrate of 6935 gallons per minute, and with a molar carbon dioxide content of 0.48 is fed into top section 8A of column 8. Top section 8A is 11 feet in diameter, 39 feet high, and filled with a 20 foot bed of stainless steel packing. This section operates at about 20.2 psia so that $CO_2$ is flashed at a rate of 1971.2 moles per hour which reduces the carbon dioxide loading in the absorbent to 0.33 moles of $CO_2$ per mole of methyldiethanolamine. This flashing reduces the absorbent temperature to 166° F. Flashed absorbent O is then conveyed to bottom section 8B which is 42 feet high. In this section, the absorbent is vacuum flashed at 9.7 psia to remove another 750.7 moles of $CO_2$ per hour so that the flash regenerated absorbent H has a loading of 0.27 moles of $CO_2$ per mole of methyldiethanolamine and a temperature of 155° F.

A 81.6 percent portion of flash regenerated absorbent H is directly recycled to the top of bulk $CO_2$ absorber 2, while the remainder is heated to 233° F. by stripping regeneration bottom product N in heat exchanger 22. From heat exchanger 22, preheated, flash regenerated absorbent H is fed into the top of stripping regeneration column 14 which is 11 feet in diameter and contains 17 sieve trays.

In stripping regeneration column 14, 793.5 moles of carbon dioxide per hour are produced as stripping regeneration overhead product M, so that the stripping regeneration bottom product N has a carbon dioxide loading of 0.01 moles per mole of methyldiethanolamine. Bottom product N is discharged at a rate 1388 gallons per minute and at a temperature of 253° F. Heat exchange with flash regenerated absorbent H reduces the temperature of stripping regeneration bottom product N to 168° F., while cooler 24 reduces the temperature of what is now lean trim absorbent F to 105° F.

Reboiler 16 heats bottom product N at a rate of 55.9 MM BTUs per hour which is equivalent to 15.9 M BTUs per mole of carbon dioxide.

EXAMPLE 2

A series of experiments were conducted in a specially designed rocking autoclave to determine the rate of carbon dioxide absorption and the vapor-liquid equilibrium for several absorbent solutions.

The autoclave is a stainless steel cylinder which is surrounded by a steam jacket around which are electric heaters. Carbon dioxide is charged to an accumulator cell from a carbon dioxide cylinder. The carbon dioxide is then transferred from the accumulator cell to the autoclave through a port in the autoclave. A port is also provided in the autoclave through which absorbent solution can be charged. The autoclave is rocked by an electric motor.

The head is provided with a port through which a thermocouple is inserted for measurement of the autoclave temperature. The accumulator cell's pressure drop is used to calculate the gram-moles of carbon dioxide charged to the autoclave. Rate of absorption data is obtained by measuring the autoclave pressure vs. time.

The following aqueous absorbent solutions were prepared:

| No. | Aqueous Absorbent |
| --- | --- |
| 1 | 50 wt. % methyldiethanolamine alone |
| 2 | 50 wt. % methyldiethanolamine plus 3.0 wt. % piperazine |
| 3 | 50 wt. % methyldiethanolamine plus 3.0 wt. % diethylenetriamine |
| 4 | 50 wt. % methyldiethanolamine plus 3.0 wt. % ethylenediamine |

Each of the aqueous absorbent solutions was separately evaluated in the rocking autoclave by initially charging one of the absorbent solutions to the autoclave and heating the solution to a 70° C. run temperature. The autoclave was then pressurized with carbon dioxide from the accumulator cell, with the pressure change of the accumulator cell being recorded. When autoclave pressurization is complete, a starting pressure is recorded, and a stop watch and the rocking motor are started simultaneously. The rate of carbon dioxide absorption is measured by recording the autoclave pressure drop with time. Equilibrium in the autoclave is assumed when the autoclave pressure ceases to change. After the equilibrium autoclave pressure is recorded, the autoclave containing the carbon dioxide-laden absorbent solution is again pressurized with additional carbon dioxide and the procedure is repeated until the final experimental solution loading or equilibrium vapor pressure of carbon dioxide is achieved. This procedure is repeated several times for a given solution until a set of carbon dioxide absorption rate data and vapor-liquid equilibrium data is obtained. Each of the 4 absorbent solutions are subjected to this testing technique.

For each charge of carbon dioxide to the autoclave, an equilibrium carbon dioxide vapor pressure is measured subsequent to the change in autoclave pressure with time. Equilibrium solution loading is then calculated as the total moles of carbon dioxide charged to the autoclave from the accumulator (calculated from accumulator pressure drop using a non-ideal equation of state) minus the moles of carbon dioxide remaining in the autoclave vapor space (calculated from autoclave equilibrium vapor pressure again using a non-ideal equation of state). The resultant vapor liquid equilibrium data is plotted as carbon dioxide vapor pressure versus solution loading.

The rate of absorption in moles of carbon dioxide absorbed per liter of solution in the autoclave per minute are calculated from autoclave pressure change with time again using a non-ideal equation of state. Grammoles of carbon dioxide are converted to cubic feet, and the rate of absorption is divided by an average partial pressure driving force in atmospheres to obtain the final rate of absorption in terms of cubic feet of carbon dioxide per hour-liter-atmospheres. The rate of absorption data can then be plotted versus equilibrium solution loading.

Figure 2:
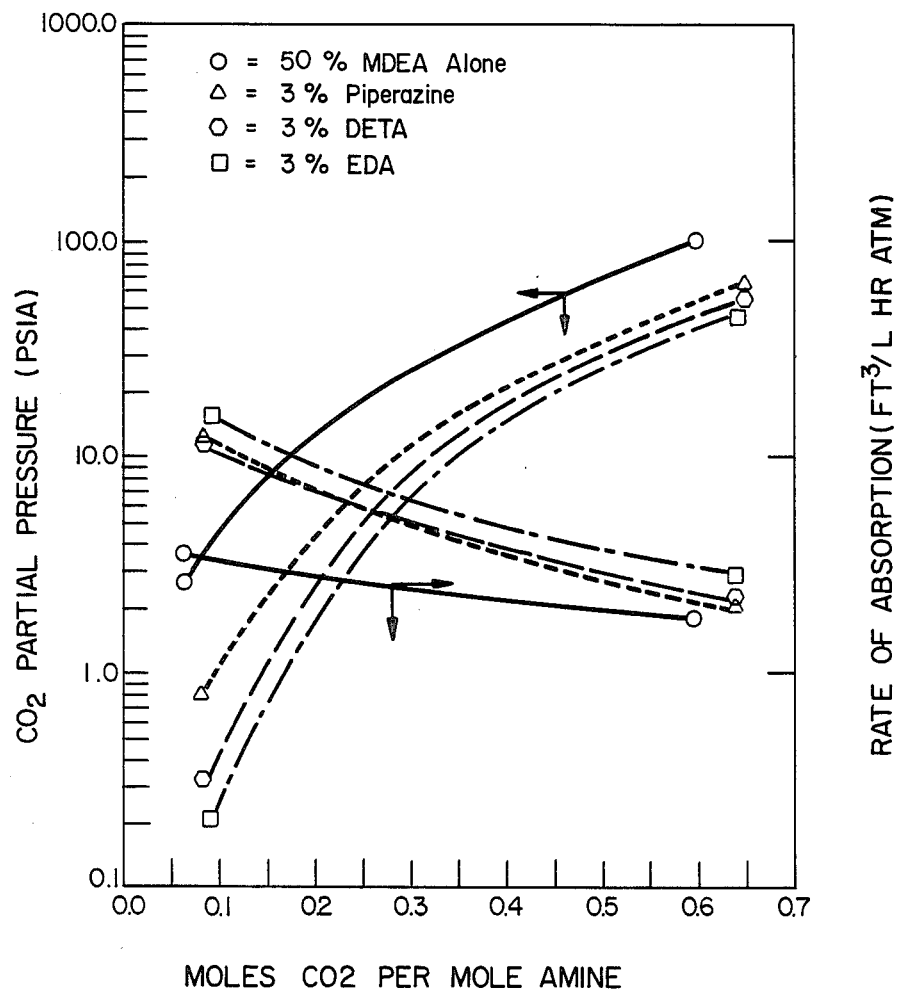
FIG. 2 is a graph showing vapor-liquid equilibrium data and rate of absorption data for absorbent solutions with 50 wt % methyldiethanolamine alone or with 3 wt % piperazine, ethylenediamine (i.e. EDA), or diethylenetriamine (i.e. DETA).

From the carbon dioxide partial pressure, the absorbent solution's carbon dioxide loading, and the solution absorption rate values for each carbon dioxide pressurization, a pair of curves can be prepared for each of the absorbents as shown in FIG. 2. One set of curves are the carbon dioxide partial pressure vs. carbon dioxide loading curves having a generally increasing slope. Another set of curve are the rate of absorption vs. carbon dioxide loading curves having a generally decreasing slope.

The curves representing the equilibrium between carbon dioxide in the vapor phase (i.e. carbon dioxide partial pressure) and carbon dioxide loading in the solution (i.e. moles carbon dioxide per mole of amine) can be used to determine the absorbent solution's circulation rate, while the rate of carbon dioxide absorbed by the solution vs. the carbon dioxide loading curves are used to determine the mass transfer rates from which absorbent column staging requirements can be ascertained.

Enhancement in the rate of absorption and solution capacity is most pronounced under trim absorber conditions where solution loadings are defined as lean and semi-rich. The difference between the commercially-utilized lean solution loading of 0.01 moles CO$_2$/mole amine and a semi-rich solution loading in equilibrium with a CO$_2$ partial pressure of 20 psia, as would exit the trim absorber and enter the bulk absorber, is then calculated using the curves from FIG. 2 for each of the four absorbent solutions. As a result, the four solutions were found to have the following loading differentials, absorption rates, and required circulation rates set forth below in Table 3.

TABLE 3

| A | B | C | D | E |
|---|---|---|---|---|
| 1 | 0.26 | 112.2 | 4.0 | 2.7 |
| 2 | 0.39 | 64.9 | 19 | 3.8 |
| 3 | 0.42 | 63.3 | 18 | 3.7 |
| 4 | 0.45 | 49.9 | 25 | 4.2 |

A = Aqueous Absorbent No.
B = Loading Differential-i.e. semi-rich minus lean (moles carbon dioxide per mole of amine).
C = Circulation Rate (gallons of solvent per pound-mole CO$_2$).
D = Lean Solution Absorption Rate (cubic feet per hour-atmosphere).
E = Semi-Rich Solution Absorption Rate (cubic feet per hour atmosphere).

From Table 3, it is apparent that the methyldiethanolamine promoted with ethylenediamine and diethylenetriamine unexpectedly have a higher carbon dioxide capacity compared to unpromoted methyldiethanolamine and to methyldiethanolamine promoted with piperazine. As a result, methyldiethanolamine solutions promoted with ethylenediamine and diethylenetriamine are capable of absorbing more carbon dioxide during trim absorption. In addition, Table 3 shows that methyldiethanolamine promoted with ethylenediamine has lean and semi-rich carbon dioxide absorption rates unexpectedly higher than those of unpromoted methyldiethanolamine alone and methyldiethanolamine promoted with piperazine. The lean and rich carbon dioxide absorption rates of methyldiethanol amine promoted with diethylenetriamine are unexpectedly better than those of methyldiethanolamine alone and about the same as those of methyldiethanolamine promoted with piperazine.

Although the invention has been described in detail for the purpose of illustration, it is understood that such detail is solely for that purpose and variations can be made therein by those skilled in the art without departing from the spirit and scope of the invention which is defined by the following claims.

What is claimed:

1. A concentrated absorbent for removing carbon dioxide from industrial gases comprising:
   at least one tertiary alkanolamine and
   at least one promotion additive comprising at least one alkyleneamine in an amount sufficient to increase the carbon dioxide absorption rate or the carbon dioxide loading of said at least one tertiary alkanolamine in an aqueous solution of 35-65 wt. % water by 25-200% or by as much as 70%, respectively, said at least one alkyleneamine being defined by the formula:

$$H_2N(C_xH_{2x}NH)_nH$$

where x is 1 to 4 and n is 1 to 12 and where the mole ratio of said alkyleneamine to said alkanolamine lies between 0.01 to 0.5.

2. A concentrated absorbent according to claim 1, wherein said at least one tertiary alkanolamine is selected from the group consisting of methyldiethanolamine, triethanolamine, dimethylethanolamine, diethylethanolamine, methyldiisopropanolamine, and mixtures thereof.

3. A concentrated absorbent according to claim 2, wherein said at least one tertiary alkanolamine is methyldiethanolamine.

4. A concentrated absorbent according to claim 2, wherein said at least one tertiary alkanolamine is triethanolamine.

5. A concentrated absorbent according to claim 1, wherein the at least one alkyleneamine is at least one ethyleneamine defined by the formula:

$$H_2N(C_2H_4NH)_nH$$
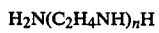

where n is 1 to 12.

6. A concentrated absorbent according to claim 5, wherein the at least one ethyleneamine additive is selected from the group consisting of ethylenediamine, diethylenetriamine, tetraethylenepentamine, and mixtures thereof.

7. A concentrated absorbent according to claim 6, wherein the at least one ethyleneamine is ethylenediamine.

8. A concentrated absorbent according to claim 7, wherein said at least one tertiary alkanolamine is methyldiethanolamine.

9. A concentrated absorbent according to claim 5, wherein said concentrated absorbent contains 1-20 wt. % of the at least one ethyleneamine.

10. A concentrated absorbent according to claim 5, wherein said concentrated absorbent contains 5-8 wt. % of the at least one ethyleneamine.

11. A concentrated absorbent according to claim 8, wherein said concentrated absorbent contains 5-8 wt. % of ethylenediamine.

12. An aqueous absorbent solution for removing carbon dioxide from industrial gases comprising:
35-65% water;
at least one tertiary alkanolamine; and
at least one promotion additive comprising at least one alkyleneamine in an amount sufficient to enhance the carbon dioxide absorption rate or the carbon dioxide loading of said at least one tertiary alkanolamine in said solution by 25-200% or by as much as 70% respectively, said at least one alkyleneamine being defined by the formula:

$$H_2N(C_xH_{2x}NH)_nH$$

where x is 1 to 4 and n is 1 to 12 and where the mole ratio of said alkyleneamine to said alkanolamine lies between 0.01 to 0.5.

13. An absorbent solution according to claim 12, wherein said absorbent solution contains 45-55 wt. % of said water.

14. An absorbent solution according to claim 12, wherein said at least one tertiary alkanolamine is selected from the group consisting of methyldiethanolamine, triethanolamine, dimethylethanolamine, diethylethanolamine, methyldiisopropanolamine, and mixtures thereof.

15. An absorbent solution according to claim 14, wherein said at least one tertiary alkanolamine is methyldiethanolamine.

16. An absorbent solution according to claim 14, wherein said at least one tertiary alkanolamine is triethanolamine.

17. An absorbent solution according to claim 12, wherein the at least one alkyleneamine is at least one ethyleneamine defined by the formula:

$$H_2N(C_2H_4NH)_nH$$

where n is 1 to 12.

18. An absorbent solution according to claim 17, wherein the at least one ethyleneamine is selected from the group consisting of ethylenediamine, diethylenetriamine, tetraethylenepentamine, and mixtures thereof.

19. An absorbent solution according to claim 18, wherein the at least one ethyleneamine is ethylenediamine.

20. An absorbent solution according to claim 19, wherein said at least one tertiary alkanolamine is methyldiethanolamine.

21. An absorbent solution according to claim 17, wherein said absorbent solution contains 0.5-10 wt. % of the at least one ethyleneamine.

22. An absorbent solution according to claim 21, wherein said absorbent solution contains 3-4 wt. % of the at least one ethyleneamine.

23. An absorbent solution according to claim 20, wherein said absorbent solution contains 3 wt. % of ethylenediamine.

24. A concentrated absorbent for removing carbon dioxide from industrial gases comprising:
1-20 wt % of at least one alkyleneamine, wherein said at least one alkyleneamine is defined by the formula:

$$H_2N(C_xH_{2x}NH)_nH$$

where x is 1 to 4 and n is 1 to 12 and
80-99 wt % of at least one tertiary alkanolamine.

25. A concentrated absorbent according to claim 24, wherein said at least one alkyleneamine is present in an amount of 5-8 wt %, while said at least one tertiary alkanolamine is present in an amount of 92-94 wt %.

26. An absorbent solution for removing carbon dioxide from industrial gases comprising:
44-55 wt % water;
41-53 wt % of a tertiary alkanolamine; and
3-4 wt % of at least one alkyleneamine, wherein said at least one alkyleneamine is defined by the formula:

$$H_2N(C_xH_{2x}NH)_nH$$

where x is 1 to 4 and n is 1 to 12.

27. An absorbent solution according to claim 26, wherein said tertiary alkanolamine is methyldiethanolamine, and said alkyleneamine is ethylenediamine.

* * * * *